US012769745B2

(12) United States Patent
Ibrahim et al.

(10) Patent No.: US 12,769,745 B2
(45) Date of Patent: Oct. 20, 2026

(54) DISTRIBUTING MODEL DATA IN MEMORIES IN NODES IN AN ELECTRONIC DEVICE

(71) Applicant: Advanced Micro Devices, Inc., Santa Clara, CA (US)

(72) Inventors: Mohamed Assem Abd Elmohsen Ibrahim, Santa Clara, CA (US); Onur Kayiran, West Henriette, NY (US); Shaizeen Aga, Sunnyvale, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 503 days.

(21) Appl. No.: 17/489,576

(22) Filed: Sep. 29, 2021

(65) Prior Publication Data

US 2023/0065546 A1 Mar. 2, 2023

Related U.S. Application Data

(60) Provisional application No. 63/239,235, filed on Aug. 31, 2021.

(51) Int. Cl.
*G06F 16/2457* (2019.01)
*G06F 16/27* (2019.01)

(52) U.S. Cl.
CPC ........ *G06F 16/24578* (2019.01); *G06F 16/27* (2019.01)

(58) Field of Classification Search
CPC ............... G06F 16/24578; G06F 16/27; G06F 16/2264; G06F 16/24552; G06F 16/2471
See application file for complete search history.

(56) References Cited

U.S. PATENT DOCUMENTS

| | | | | |
|---|---|---|---|---|
| 9,053,167 | B1 * | 6/2015 | Swift | G06F 16/27 |
| 10,067,949 | B1 * | 9/2018 | Stacey, Jr. | G06F 16/182 |

(Continued)

OTHER PUBLICATIONS

Gupta et al., "The Architectural Implications of Facebook's DNN-based Personalized Recommendation", International Symposium on High-Performance Computer Architecture, Feb. 15, 2020, 14 pages, https://arxiv.org/pdf/1906.03109.pdf. [Retrieved Jun. 2, 2022].

(Continued)

*Primary Examiner* — Jay A Morrison
(74) *Attorney, Agent, or Firm* — Kowert, Hood, Munyon, Rankin & Goetzel, P.C.; Rory D. Rankin

(57) ABSTRACT

An electronic device includes a plurality of nodes, each node having a processor that performs operations for processing instances of input data through a model, a local memory that stores a separate portion of model data for the model, and a controller. The controller identifies model data that meets one or more predetermined conditions in the separate portion of the model data in the local memory in some or all of the nodes that is accessible by the processors when processing the instances of input data through the model. The controller then copies the model data that meets the one or more predetermined conditions from the separate portion of the model data in the local memory in the some or all of the nodes to local memories in other nodes. In this way, the controller distributes model data that meets the one or more predetermined conditions among the nodes, making the model data that meets the one or more predetermined conditions available to the nodes without performing remote memory accesses.

22 Claims, 6 Drawing Sheets

(56) References Cited

U.S. PATENT DOCUMENTS

| | | | | |
|---|---|---|---|---|
| 10,915,447 | B1 | 2/2021 | Yau | |
| 10,922,231 | B1 | 2/2021 | Gray et al. | |
| 2002/0194130 | A1* | 12/2002 | Maegawa | H04L 63/10 705/51 |
| 2007/0276835 | A1* | 11/2007 | Murthy | G06F 21/6227 707/999.009 |
| 2014/0289332 | A1 | 9/2014 | Frosst | |
| 2016/0171068 | A1* | 6/2016 | Hardin | G06F 16/24565 707/610 |
| 2017/0300253 | A1* | 10/2017 | Parker | G06F 3/0631 |
| 2018/0268046 | A1* | 9/2018 | Xiong | G06F 16/2272 |
| 2019/0243766 | A1 | 8/2019 | Doerner | |
| 2019/0378016 | A1* | 12/2019 | John | G06N 3/04 |
| 2021/0019284 | A1* | 1/2021 | Bowman | G06F 9/5072 |
| 2021/0157500 | A1 | 5/2021 | Gu et al. | |
| 2021/0342427 | A1* | 11/2021 | Popov | G06F 21/316 |
| 2024/0037378 | A1* | 2/2024 | Ma | G06N 3/063 |

OTHER PUBLICATIONS

Hwang et al., "Centaur: A Chiplet-based, Hybrid Sparse-Dense Accelerator for Personalized Recommendations", Proceedings of the 47th IEEE/ACM International Symposium on Computer Architecture, May 12, 2020, 14 pages, https://arxiv.org/pdf/2005.05968.pdf. [Retrieved Jun. 2, 2022].

Ke et al., "RecNMP: Accelerating Personalized Recommendation with Near-Memory Processing", Proceedings of the ACM/IEEE 47th Annual International Symposium on Computer Architecture, Dec. 30, 2019, 14 pages, https://arxiv.org/pdf/1912.12953.pdf. [Retrieved Jun. 2, 2022].

Kwon et al., "TensorDIMM: A Practical Near-Memory Processing Architecture for Embeddings and Tensor Operations in Deep Learning", Proceedings of the 52nd Annual IEEE/ACM International Symposium on Microarchitecture, Aug. 25, 2019, 14 pages, https://arxiv.org/pdf/1908.03072.pdf. [Retrieved Jun. 2, 2022].

Naumov et al., "Deep Learning Recommendation Model for Personalization and Recommendation Systems", May 31, 2019, 10 pages, https://arxiv.org/pdf/1906.00091.pdf. [Retrieved Jun. 2, 2022].

Park et al., "Deep Learning Inference in Facebook Data Centers: Characterization, Performance Optimizations and Hardware Implications", Nov. 29, 2018, 12 pages, https://arxiv.org/pdf/1811.09886.pdf. [Retrieved Jun. 2, 2022].

Yin et al., "TT-Rec: Tensor Train Compression for Deep Learning Recommendation Models", Conference on Machine Learning and Systems, Jan. 25, 2021, 15 pages, https://arxiv.org/pdf/2101.11714.pdf. [Retrieved Jun. 2, 2022].

* cited by examiner

| IID | DF | CATEGORICAL FEATURES | | | | | |
|---|---|---|---|---|---|---|---|
| | | T0 | T1 | T2 | T3 | T4 | T5 |
| 0 | X | 1,3,4 | 0,1,5 | 0,3,7 | 0,2,5 | 1,4,5 | 4,6,7 |
| 1 | Y | 0,1,4 | 0,4,7 | 0,2,3 | 2,3,5 | 0,4,5 | 4,6,7 |
| 2 | Z | 4,5,6 | 0,5,7 | 0,3,5 | 2,5,7 | 4,5,6 | 4,1,7 |
| 3 | W | 1,4,7 | 0,2,7 | 0,1,3 | 3,5,6 | 3,4,5 | 4,6,7 |

MODEL DATA DISTRIBUTION

NODE0

| IID | DF | CATEGORICAL FEATURES | | |
|---|---|---|---|---|
| | | T0 | T1 | T2 |
| 0 | X | 1,3,4 | 0,1,5 | 0,3,7 |
| 1 | Y | 0,1,4 | 0,4,7 | 0,2,3 |
| 2 | | 4,5,6 | 0,5,7 | 0,3,5 |
| 3 | | 1,4,7 | 0,2,7 | 0,1,3 |

NODE1

| IID | DF | CATEGORICAL FEATURES | | |
|---|---|---|---|---|
| | | T3 | T4 | T5 |
| 0 | | 0,2,5 | 1,4,5 | 4,6,7 |
| 1 | | 2,3,5 | 0,4,5 | 4,6,7 |
| 2 | Z | 2,5,7 | 4,5,6 | 4,1,7 |
| 3 | W | 3,5,6 | 3,4,5 | 4,6,7 |

FIG. 2

DISTRIBUTING MODEL DATA IN MEMORIES IN NODES IN AN ELECTRONIC DEVICE

RELATED APPLICATIONS

The instant application is a non-provisional application from, and hereby claims priority to, U.S. provisional application No. 63/239,235, which was filed on 31 Aug. 2021, and which is incorporated by reference herein.

BACKGROUND

Related Art

Some electronic devices perform operations for processing instances of input data through computational models, or “models,” to generate outputs. There are a number of different types of models, for each of which electronic devices generate specified outputs based on processing respective instances of input data. For example, one type of model is a recommendation model. Processing instances of input data through recommendation models causes electronic devices to generate ranked lists of items from among a set of items to be presented to users as recommendations (e.g., products for sale, movies or videos, social media posts, etc.). For a recommendation model, instances of input data include information about users and/or others, information about the items, information about context, etc. and processing the instances of input data through internal elements of the recommendation model, which are defined by model data, causes the electronic device to generate the ranked lists of items. In some cases, models are used in production scenarios at very large scales, such as when a recommendation model is used for recommending videos from among millions of videos to each user among millions of users (e.g., on a website such as YouTube).

Due to the properties of input data in some cases, it has proven difficult to design models that consistently produce high quality outputs. For example, one significant source of input data for recommendation models that recommend videos for users to view from among millions of videos is information about the users’ previously viewed videos. The information about the users’ previously viewed videos is typically quite sparse, consisting of perhaps a few dozen videos among the millions of videos. Given sparse input data, using some types of models alone (e.g., multilayer perceptrons, generalized linear models, etc.) has resulted in outputs (e.g., recommendations, etc.) that are not entirely satisfactory. Designers have therefore proposed combined models with interacting sub-models that generate more satisfactory outputs from sparse input data. FIG. 1 presents a block diagram illustrating a model 100 with a pair of sub-models 102-104. Sub-model 102 is a multilayer perceptron 106 used for processing dense features 108 in input data. Sub-model 104 is a generalized linear model used for processing categorical features 110 in input data via table lookups in embedding table 112. The outputs of each of sub-models 102 and 104 are combined in combination 114 to form a combined intermediate value (e.g., by combining vector outputs from each of sub-model 102 and 104). From combination 114, the combined intermediate value is sent to multilayer perceptron 116 to be used for generating a model output 118. One example of a model arranged similarly to model 100 is the deep learning recommendation model (DLRM) described by Naumov et al. in the paper “Deep Learning Recommendation Model for Personalization and Recommendation Systems,” arXiv:1906.00091, May 2019.

In some electronic devices, multiple compute nodes, or “nodes,” are used for processing instances of input data through models to generate outputs. These electronic devices can include many nodes, with each node including one or more processors (e.g., central processing units, graphics processing units, etc.) and a local memory. For example, the nodes can be or include server nodes in server blades in a data center, integrated circuit chips mounted in sockets on a circuit board, etc. In these electronic devices, individual nodes may process instances of input data through the model end-to-end, but in some cases, individual nodes are used for processing instances of input data through particular portions of the model. For example, for model 100, a given node may perform some or all of the operations for multilayer perceptrons 106 or 116, embedding table 112, combination 114, etc.

When using multiple nodes for processing instances of input data through models, a number of different schemes can be used for determining where model data is stored in memories in the nodes. Generally, model data includes information that describes, enumerates, and/or identifies arrangements or properties of internal elements of a model—and thus defines or characterizes the model. For example, for model 100, model data includes data in rows of embedding table 112, information about the internal arrangement of multilayer perceptrons 106 and 116, and/or other model data. One scheme for determining where model data is stored in memories in the nodes is data parallelism. For data parallelism, full copies of model data are replicated/stored in the memory in individual nodes. For example, a full copy of model data for multilayer perceptron 106 in model 100 can be replicated in each node that performs processing operations for multilayer perceptron 106. Another scheme for determining where model data is stored in memories in the nodes is model parallelism. For model parallelism, separate portions of model data are stored in the memory in individual nodes. The memory in each node therefore stores a different part—and possibly a relatively small part—of the full model data. For example, separate portions of model data such as groups of rows from embedding table 112 for model 100 can be stored in the memory of each node that uses embedding table 112 for processing instances of input data. In some electronic devices, model parallelism is used where the model data is sufficiently large in terms of bytes that it is impractical or impossible to store a full copy of the model data in any particular node’s memory. For example, in some cases, embedding table 112 is too large to be stored in any individual node’s memory (and may be far too large) and portions of embedding table 112 are therefore distributed among multiple nodes’ memories.

In electronic devices in which portions of model data are distributed among multiple nodes in accordance with model parallelism, individual nodes may need to acquire model data stored in memories in other nodes for processing instances of input data through the model. For example, when separate portions of embedding table 112, i.e., groups of rows from embedding table 112, are distributed among the memories in multiple nodes, a given node may need to acquire information from rows of embedding table 112 in portions of embedding table 112 stored in other nodes’ memories. In some cases, this means that the given node itself must perform remote memory accesses via a communication fabric to acquire the information from the rows of embedding table 112 in the separate portions of embedding table 112 stored in the other nodes' memories. In other cases, a controller distributes requests to other nodes to provide, to the given node, the information from the rows of embedding table 112 in the separate portions of embedding table 112 stored in the other nodes' memories (or data generated based thereon, e.g., by combining or adding multiple rows, etc.). In either case, many of such operations may be required in order for the given node to acquire all the model data needed for processing a large number of instances of input data. The operations consume bandwidth on the communication fabric and can require processing by one or both the sending and receiving nodes, which limits the available capacity of some or all of the communication fabric, the sending node, and/or the receiving node for performing other operations.

FIG. 2 presents a block diagram illustrating a distribution of model data in nodes and model data that is used when processing instances of input data in the nodes. For the operations in FIG. 2, it is assumed that the model data is distributed among nodes0-1 with: (1) data parallelism for the model data for multilayer perceptron 106 and (2) model parallelism for the model data for embedding table 112. Each of nodes0-1 therefore stores a full copy of model data for multilayer perceptron 106 in the local memory for that node. On the other hand, node0 stores tables T0-T2 (which are or include separate portions of/groups of rows from embedding table 112) in node0's local memory and node1 stores tables T3-T5 in node1's local memory. As shown via the rows of the tables, instances of input data 0-1 are assigned to node0 and instances of input data 2-3 are assigned to node1 for processing through the model. Processing each instance of input data through the model includes processing respective dense features through multilayer perceptron 106 and performing table lookups for three locations in each of tables T0-T5 for processing respective categorical features. For example, node0 processes instance of input data 0's dense features X through multilayer perceptron 106 and performs lookups in tables T0-T5 for the categorical feature indices shown in FIG. 2 (e.g., indices 1, 3, and 4 in T0; 0, 1, and 5 in T1, etc.). While the lookups in tables T0-T2 can be performed using data acquired from the local memory in node 0, because tables T3-T5 are stored in node 1's local memory, node0 sends a remote memory access request to node1 for the data in tables T3-T5 at the identified rows—or data generated based thereon, e.g., by combining together two or more rows (the indices/rows of tables T3-T5 accessed by node0 are shown as shaded in node1 in FIG. 2). Node0 performs similar operations for instance of input data 1. Node1 also performs similar operations for instances of input data 2-3, including corresponding remote memory accesses for reading data from tables T0-T2 in node0 (also shown as shaded in FIG. 2). As an alternative to the nodes themselves performing remote memory accesses to acquire model data, in some electronic devices, a controller (e.g., one of the nodes, a separate controller, etc.) distributes lookups in embedding table 112 to the individual nodes using a record of the model data that is stored in the local memory in each node. In other words, the controller distributes the lookups in embedding table 112, rather than the nodes themselves. In this case, after performing lookups in embedding table 112, each node communicates the identified rows—or data generated based thereon, e.g., by combining together two or more rows—to the node that is to use them for subsequent operations for processing instances of input data through the model. Continuing the example, the controller would communicate a request for indices 1, 4, 5, 6, and 7 for table T0, indices 0, 2, 5, and 7 for table T1, etc. to node0. Node0 would perform the corresponding lookups and then communicate the results of the corresponding lookups to node1—and the same would happen for node0's lookups in embedding tables T3-T5. As described above, the communication of model data and/or results performed by nodes0-1 consume bandwidth on the communication fabric and can require processing by one or both of the sending and receiving nodes, which limits the other/alternative operations that can be performed communication fabric and the sending and receiving nodes.

BRIEF DESCRIPTION OF THE FIGURES

FIG. 2 presents a block diagram illustrating a distribution of model data in nodes and model data used when processing instances of input data in the nodes.

Throughout the figures and the description, like reference numerals refer to the same figure elements.

DETAILED DESCRIPTION

Figure 1:
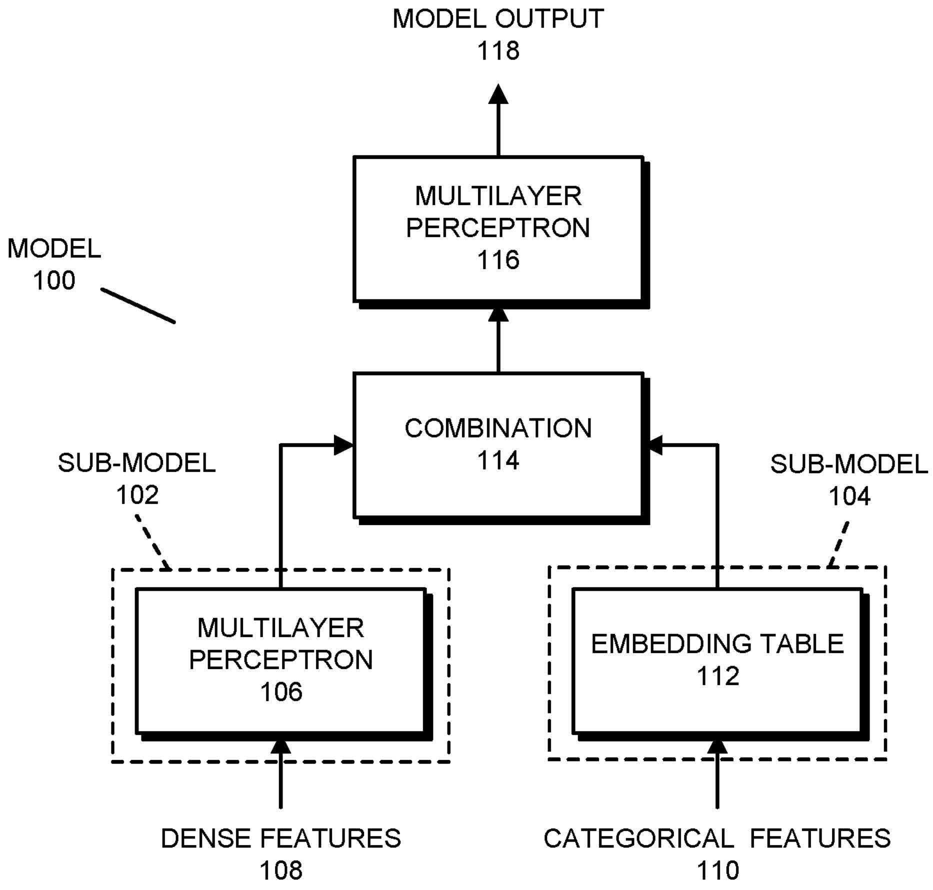
FIG. 1 presents a block diagram illustrating a model.

The following description is presented to enable any person skilled in the art to make and use the described embodiments and is provided in the context of a particular application and its requirements. Various modifications to the described embodiments will be readily apparent to those skilled in the art, and the general principles described herein may be applied to other embodiments and applications. Thus, the described embodiments are not limited to the embodiments shown, but are to be accorded the widest scope consistent with the principles and features described herein.

Terminology

In the following description, various terms are used for describing embodiments. The following is a simplified and general description of some of the terms. Note that these terms may have significant additional aspects that are not recited herein for clarity and brevity and thus the description is not intended to limit these terms.

Functional block: functional block refers to a set of interrelated circuitry such as integrated circuit circuitry, discrete circuitry, etc. The circuitry is "interrelated" in that circuit elements in the circuitry share at least one property. For example, the circuitry may be included in, fabricated on, or otherwise coupled to a particular integrated circuit chip, substrate, circuit board, or portion thereof, may be involved in the performance of specified operations (e.g., computational operations, control operations, memory operations, etc.), may be controlled by a common control element and/or a common clock, etc. The circuitry in a functional block can have any number of circuit elements, from a single circuit element (e.g., a single integrated circuit logic gate or discrete circuit element) to millions or billions of circuit elements (e.g., an integrated circuit memory). In some embodiments, functional blocks perform operations "in hardware," using circuitry that performs the operations without executing program code.

Data: data is a generic term that indicates information that can be stored in memories and/or used in computational, control, and/or other operations. Data includes information such as actual data (e.g., results of computational or control operations, outputs of processing circuitry, inputs for computational or control operations, variable values, sensor values, etc.), files, program code instructions, control values, variables, and/or other information.

Memory accesses: memory accesses, or, more simply, accesses, include interactions that can be performed for, on, using, and/or with data stored in memory. For example, accesses can include writes or stores of data to memory, reads of data in memory, invalidations or deletions of data in memory, moves of data in memory, writes or stores to metadata associated with data in memory, etc. In some cases, copies of data are accessed in a cache and accessing the copies of the data can include interactions that can be performed for, on, using, and/or with the copies of the data stored in the cache (such as those described above), along with cache-specific interactions such as updating coherence or access permission information, etc.

Models

In the described embodiments, computational nodes, or "nodes," in an electronic device perform operations for processing instances of input data through a computational model, or "model." A model generally includes — or is defined as—a number of operations to be performed on, for, or using instances of input data to generate corresponding outputs. For example, in some embodiments, the nodes perform operations for processing instances of input data through a model such as model 100 as shown in FIG. 1. Model 100 is one embodiment of a recommendation model that is used for generating ranked lists of items for presentation to a user.

For example, model 100 can be used for generating ranked lists of items such as videos on a video presentation website, software applications to purchase from among a set of software applications provided on an Internet application store, etc. Model 100 is sometimes called a "deep and wide" model that uses the combined output of sub-models 102 (the "deep" portion) and 104 (the "wide" portion) for generating the ranked list of items. As described above, in some embodiments, model 100 is similar to the deep learning recommendation model (DLRM) described by Naumov et al. in the paper "Deep Learning Recommendation Model for Personalization and Recommendation Systems."

Models are defined or characterized by model data, which is or includes information that describes, enumerates, and identifies arrangements or properties of internal elements of a model. For example, for model 100, the model data includes embedding table 112 (i.e., rows of index-value pairings, etc.), configuration information for multilayer perceptrons 106 and 116 such as weights, bias values, etc. used for processing operations for hidden layers within the multilayer perceptrons (not shown in FIG. 1), and/or other model data. In the described embodiments, certain model data is handled using model parallelism (other model data may be handled using data parallelism). Portions of at least some of the model data are therefore distributed among multiple nodes in the electronic device, with separate portions of the model data being stored in local memories in each of the nodes. For example, assuming that model 100 is the model, individual portions of embedding table 112 can be stored in local memories in multiple (and possibly many) nodes. For instance, a respective subset of rows from among a set of rows in embedding table 112 can be stored in the memory in each of the nodes. In some embodiments, specified model data is distributed using model parallelism because the specified model data is too large in terms of bytes for it to be practical (or maybe possible) to store the specified model data in the memory in individual nodes. Continuing the model 100 example, in some embodiments, portions of embedding table 112 are stored in memories in different nodes because embedding table 112 is too large to be entirely stored in a single node's memory.

For processing instances of input data through a model, the instances of input data are processed through internal elements of the model to generate an output from the model. Generally, an instance of input data is one piece of the particular input data that is to be processed by the model, such as information about a user to whom a recommendation is to be provided for a recommendation model. Using model 100 as an example, each instance of input data includes dense features 108 and categorical features 110, which include and/or are generated based on information about a user, context information, item information, and/or other information. For example, categorical features 110 may be or include a 1 hot vector with a number of single-bit vector elements, each of which represents an aspect or property of an instance of input data. In a 1 hot vector, a vector element is set to 1 (e.g., to a logical high value such as VSS) to indicate that a corresponding aspect or property is present and set to 0 to indicate that the corresponding aspect or property is not present. For instance, user=adult may be an aspect represented by a given vector element in a 1 hot vector and the given vector element is set to 1 when the user represented by the instance of input data is an adult, but set to 0 when the user is not an adult.

For processing an instance of input data through the model, at least one node receives the instance of input data and performs operations for processing the instance of input data. For example, in some embodiments, for processing an instance of input data through model 100, a given node receives the dense features 108 and categorical features 110 for the instance of input data. The given node then performs operations for processing dense features 108 through multilayer perceptron 106 to generate an output for multilayer perceptron 106. For this operation, the given node uses corresponding model data to determine the internal arrangement and characteristics of elements in multilayer perceptron 106. The given node also performs operations for processing categorical features 110 by performing respective lookups in embedding table 112 to generate outputs. For this operation, the given node uses corresponding model data, i.e., rows of embedding table 112, to perform the lookups. The given node then combines the outputs from multilayer perceptron 106 and embedding table 112 to generate an intermediate value (e.g., a combined vector generated based on vectors output from multilayer perceptron 106 and embedding table 112). The given node next processes the intermediate value through multilayer perceptron 116 to generate model output 118. For this operation, the given node uses corresponding model data to determine the internal arrangement and characteristics of elements in multilayer perceptron 116. The model output 118 is in the form of a ranked list (e.g., a vector or other listing) of items to be presented to a user as a recommendation.

Although particular models (e.g., model 100) are used for examples herein for clarity and brevity, the described embodiments are operable with other types of models.

Generally, in the described embodiments, any type of model can be used for which separate portions of model data are stored in local memories in multiple nodes in an electronic device (i.e., for which some or all model data is distributed using model parallelism). In addition, although a single node, i.e., the given node, is used for describing processing an instance of input data through a model in the example above, in some embodiments, different nodes (or combinations of nodes) are used for processing instances of input data. Generally, in the described embodiments, any number and/or arrangement of nodes in an electronic device can be used for processing instances of input data through a model, as long as some or all of the nodes have a local memory in which separate portions of model data are stored.

Overview

In the described embodiments, an electronic device includes a number of nodes communicatively coupled together via a communication fabric. Each of the nodes includes at least one processor (e.g., a central processing unit, graphics processing unit, etc.) and a local memory. The processors in some or all of the nodes perform operations for processing instances of input data through a model. For example, in some embodiments, the processors in the nodes perform operations for processing instances of input data through a recommendation model such as model 100 as shown in FIG. 1. Processing instances of input data through the model includes using model data for, by, and/or as values for internal elements of the model for performing respective operations. Continuing the model 100 example, the model data includes embedding table 112 and model data identifying arrangements and characteristics of elements in multilayer perceptrons 106 and 116. At least some of the model data is distributed among the nodes, with separate portions of the model data being stored in the local memory in multiple nodes (i.e., in accordance with model parallelism). Again continuing the model 100 example, embedding table 112 can be distributed among multiple nodes, with a different subset of rows (or other elements or combinations thereof) from embedding table 112 stored in the local memory in each of the multiple nodes. The described embodiments perform operations for identifying model data in the local memories in some of all of the nodes that meets one or more predetermined conditions and copying the model data that meets the one or more predetermined conditions from the local memories in the some or all of the nodes to the local memories in other nodes. In other words, the described embodiments distribute/replicate copies of model data that meets the one or more predetermined conditions that would ordinarily be limited to being stored in the local memories in particular nodes to some or all of the other nodes. In this way, the described embodiments make given model data that meets the one or more predetermined conditions available in the local memories of the other nodes, so that the other nodes no longer have to use remote memory accesses via the communication fabric for accessing the given model data and/or receive the model data via the communication fabric.

In some embodiments, the one or more predetermined conditions used for determining whether particular model data in a node is to be copied to other nodes' local memories include conditions under which the costs associated with copying and storing the particular model data in local memories in the other nodes is outweighed by the benefits of having the particular model data stored in the local memories of the other nodes. For example, in some embodiments, a predetermined condition is a frequency of access of model data. As another example, in some embodiments, a predetermined condition includes metadata associated with pieces of model data being set to specified values (e.g., to identify (or not identify) the model data as having a given importance for processing instances of input data through the model). As yet another example, in some embodiments, a predetermined condition includes the internal content of model data, such as model data that includes or is associated with specified values. As yet another example, in some embodiments, a predetermined condition includes a tendency to change (or not to change) of the model data, i.e., model data has a known or predicted stability in value.

In some embodiments, a controller (or another functional block) performs operations for distributing model data that meets one or more predetermined conditions among nodes in the electronic device. In these embodiments, the controller first identifies model data that meets the one or more predetermined conditions in separate portions of the model data in local memories in nodes. For example, in an embodiment in which a predetermined condition is a frequency of access of model data, the controller can monitor, estimate, compute, and/or otherwise acquire information about the number of accesses of particular model data when processing the model, compare the number of accesses to a threshold, and determine that particular model data that is accessed more than a threshold number of times is frequently accessed model data. Using embedding table 112 as an example, for this operation, the controller can monitor, estimate, compute, and/or otherwise acquire information about the number of accesses of particular rows in embedding table 112 when processing the model (i.e., when performing table lookups) and can determine that particular rows are frequently accessed when a number of accesses of the row is higher than a threshold value. After identifying the model data that meets the one or more predetermined conditions, the controller copies/replicates the model data that meets the one or more predetermined conditions from the separate portion of the model data in the local memory in the nodes to local memories in other nodes. Continuing the embedding table 112 example, the controller can copy individual rows of the embedding table from the model data in the local memory in the nodes to local memories in other nodes.

In some embodiments, when processing the model, the processor in a given node preferentially reads the model data from the local memory in the given node. When the model data is not available in the local memory, however, the processor in the given node uses a remote memory access via the communication fabric to read the model data from a local memory in another node. The given node therefore acquires, from the local memory in the given node: (1) model data available in the portion of the model data stored in the local memory for the given node (i.e., the model data that was stored in the local memory for the given node as the model data was originally distributed among the nodes) and (2) model data that meets one or more predetermined conditions that was copied to the given node's local memory from other nodes' local memories. Continuing the embedding table 112 and frequency of access example, the given node accesses, in the given node's local memory, rows of embedding table 112 that were stored in the local memory in accordance with the above-described model parallelism, as well as frequently accessed rows of embedding table 112 that were copied from other nodes' memories into the local memory by the controller as described above. The given node also acquires, from local memories for other nodes using remote memory accesses, other model data that is only available in the separate portions of the model data stored in the local memories for the other nodes. Again continuing the embedding table 112 example, the given node accesses rows of embedding table 112 that are not to be found in the given node's local memory in other nodes' memories. After reading the model data from either the local memory in the given node and/or the local memories in other nodes, the given node uses the model data for processing instances of input data through the model. Again continuing the embedding table 112 example, the given node requests particular indices of embedding table 112 from other nodes and receives, in response, information from the corresponding rows of the embedding table 112—or data based thereon, e.g., by combining two or more rows into a combined row. The given node then uses the rows for performing subsequent processing operations for processing the instance of input data (i.e., provides the rows to combination 114 to be combined with outputs of multilayer perceptron 106).

As an alternative to the above-described embodiments in which the nodes themselves use remote memory accesses to acquire model data from other nodes for processing instances of input data through the model, in some embodiments, a controller (or another functional block) assists the nodes in acquiring model data. In these embodiments, the controller distributes specified operations to acquire model data (e.g., lookups in embedding table 112) to the nodes for processing therein based on the model data that is stored in local memories in each of the nodes. The controller can distribute the specified operations so that the specified operations are preferentially sent to nodes that are processing instances of input data and have the necessary model data stored in their local memories. Continuing the embedding table 112 example, the controller can send lookup requests (i.e., requests to look up specified indices in the embedding table 112) to nodes that are processing instances of input data and have the desired rows of the embedding table stored in their local memories—either in the portion of the embedding table stored in the local memory or in the copies of the model data that meets one or more predetermined conditions stored in the local memory. When the nodes that are processing the instances of input data do not have the necessary model data stored in the local memories, however, the controller falls back to sending the specified operations to other nodes that have the necessary model data stored in their local memories. Continuing the example, the controller can send lookup requests to the other nodes that cause the other nodes to send the corresponding rows—or data based thereon, e.g., by combining two or more rows into a combined row—to the nodes that are processing the instances of input data. In this way, nodes that are processing instances of input data will automatically receive needed model data from other nodes.

In some embodiments, the controller (or another entity) selects/sets an amount (e.g., in terms of bytes, elements, etc.) of the model data that is used as/included in the model data that is copied between the nodes. In other words, the controller sets the amount of model data that meets one or more predetermined conditions that is to be distributed among the nodes as described above (such as by setting a threshold based on which the model data is selected). Using embedding table 112 and frequency of access as an example, the controller can select/set a number of rows in the frequently accessed model data (e.g., N rows out of an M row table, N=1000 or another number and M=1,000,000 or another number). In these embodiments, the controller can use various factors for selecting/setting the amount of the model data, such as a past, present, or estimated future available capacity for storing model data that meets the one or more predetermined conditions in local memories in some or all of the nodes, an amount of past, present, or estimated future communication traffic between the nodes, etc.

In some embodiments, the controller performs the above-described operations for distributing model data that meets one or more predetermined conditions among nodes dynamically. In other words, in these embodiments, while and/or after the nodes have processed one or more instances of input data through the model, the controller performs the operations for distributing model data that meets the one or more predetermined conditions among nodes. In these embodiments, the particular model data that meets the one or more predetermined conditions can be determined at least in part using information about the prior/actual properties of the model data and/or operations involving the model data while processing the one or more instances of input data through the model (e.g., the number of accesses of model data, the contents of model data, the tendency of the model data to change, etc.). In some embodiments, however, the controller statically performs the above-described operations for distributing model data that meets the one or more predetermined conditions among nodes. In other words, in these embodiments, before the nodes have processed instances of input data through the model, the controller performs the operations for distributing model data that meets the one or more predetermined conditions among nodes. In these embodiments, the particular model data that meets the one or more predetermined conditions can be determined at least in part using information about the model and/or other models to calculate the model data that meets the one or more predetermined conditions. Because the distribution is performed statically, in some of these embodiments, the model data that meets the one or more predetermined conditions is estimated or predicted. In some embodiments, the controller performs a combination of static and dynamic distribution of model data that meets the one or more predetermined conditions. For example, in some embodiments, the model data that meets the one or more predetermined conditions is predicted randomly for the static distribution (so that at least some data is initially made available in local memories in other nodes)—and one or more dynamic distributions of model data that meets the one or more predetermined conditions are subsequently done based on model data accessed while or after processing one or more instances of input data through the model.

In some embodiments, controller performs the above-described operations for distributing model data that meets one or more predetermined conditions among nodes more than once—and may perform the operations repeatedly or periodically. In other words, in these embodiments, after distributing model data that meets the one or more predetermined conditions among the nodes a first time, the controller identifies updated model data that meets the one or more predetermined conditions and copies the updated model data that meets the one or more predetermined conditions from the portion of the model data in the local memory in the some or all of the nodes to local memories in other nodes. For example, the controller can perform the above-described combination of static and dynamic distribution of model data that meets the one or more predetermined conditions among the nodes. In this way, the controller replaces given model data with more recent model data that meets the one or more predetermined conditions, which enables the controller to adapt to changing properties of the model data and/or operations involving the model data as instances of input data are processed through the model. In some embodiments, distributing updated model data that meets the one or more predetermined conditions among the nodes involves overwriting some or all existing copies of model data that meets the one or more predetermined conditions in the local memories in nodes with the updated model data that meets the one or more predetermined conditions, thereby replacing the existing copies of model data.

By distributing copies of model data that meets one or more predetermined conditions among nodes in the electronic device (i.e., identifying model data that meets the one or more predetermined conditions in local memories in nodes and copying the identified model data to local memories in other nodes), the described embodiments help to make the copies of the model data that meet the one or more predetermined conditions more rapidly and readily available to the other nodes. Distributing the copies of model data can therefore speed up the processing of instances of input data through models in the nodes. In addition, distributing the copies of model data can reduce the number of remote memory accesses communicated between nodes in the electronic device, which lowers the bandwidth consumption on a communication fabric and reduces processing overhead in both sending and receiving nodes. By identifying the model data to be copied based on the one or more predetermined conditions, the described embodiments can ensure that model data is copied that is more likely to be accessed in the other nodes (rather than, say, randomly copying model data to the other nodes, etc.). By selecting the amount of model data that is distributed (i.e., based on factors such as capacity for storing copies of model data in the other nodes), the described embodiments ensure the other nodes are not overwhelmed by copies of model data—and that an inordinate amount of traffic is not introduced on the communication fabric for distributing the copies of the model data among the nodes. By performing the distribution of copies of model data (including statically and/or dynamically) more than once, the described embodiments can adapt the copies of model data stored in local memories based on current identification(s) of model data that meets the one or more predetermined conditions. By improving the performance of the nodes and the communication fabric when processing instances of input data through the model in these ways, the described embodiments improve the overall performance of the electronic device, which increases user satisfaction with the electronic device.

Electronic Device

Figure 3:
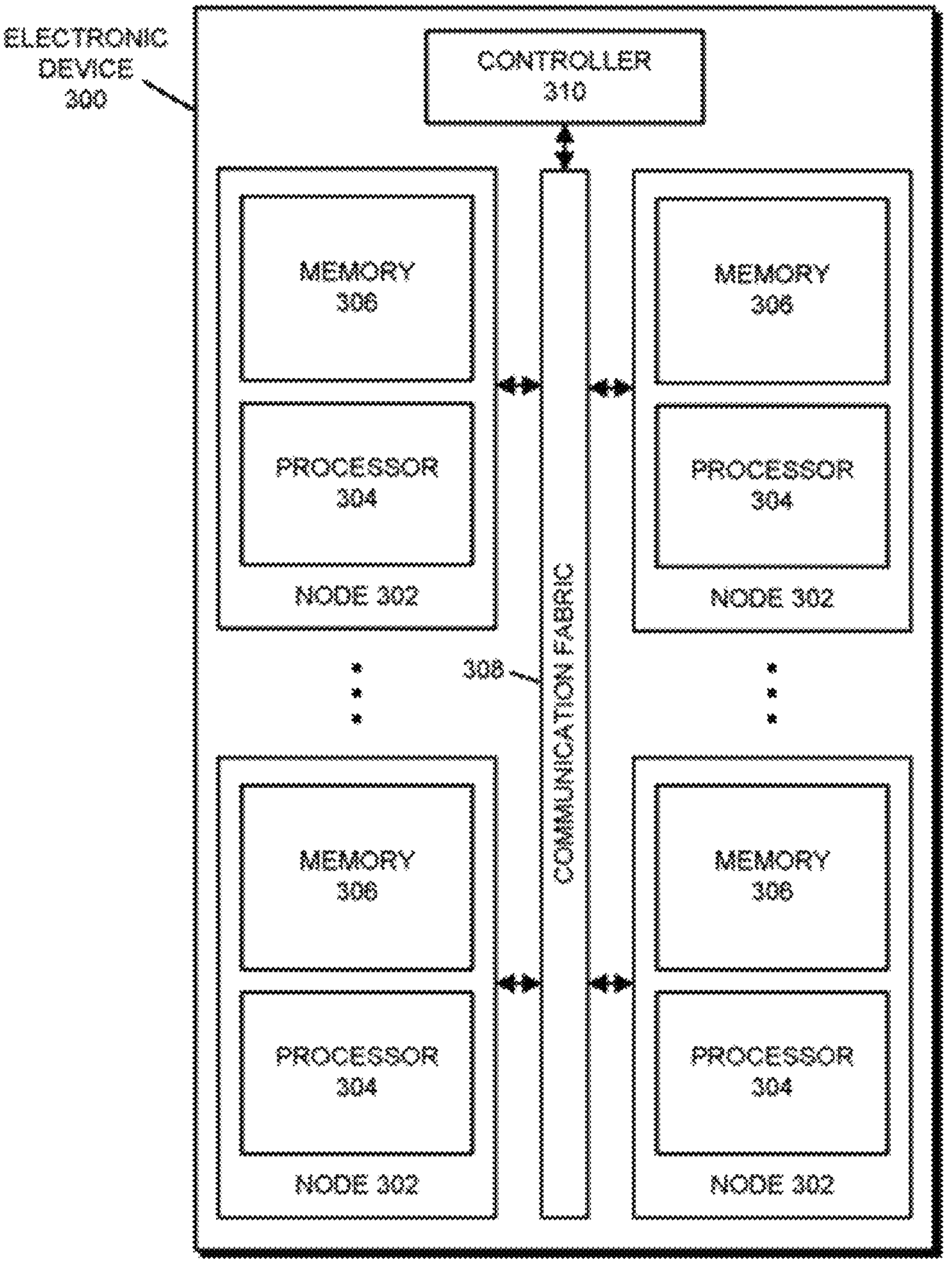
FIG. 3 presents a block diagram illustrating an electronic device in accordance with some embodiments.

FIG. 3 presents a block diagram illustrating electronic device 300 in accordance with some embodiments. As can be seen in FIG. 3, electronic device 300 includes a number of nodes 302 coupled to a communication fabric 308. Each node 302 includes a set of functional blocks, devices, parts, and/or elements that perform computational operations, memory operations, communication operations, and/or other operations. For example, in some embodiments, electronic device 300 includes, for each node 302, at least one socket, holder, or other mounting element to which is coupled (i.e., plugged, held, mounted, etc.) one or more semiconductor integrated circuit chips having integrated circuits in which are implemented that node 302's functional blocks, devices, parts, and/or elements. For instance, in some embodiments, electronic device 300 includes multiple sockets on one or more motherboards, circuit boards, interposers, etc. and processor integrated circuit chips, memory integrated circuit chips, etc. for each node 302 are plugged into or otherwise mounted to respective sockets. As another example, in some embodiments, each node 302's functional blocks, devices, parts, and/or elements are included in a chassis or housing such as a server chassis or computing device housing.

As can be seen in FIG. 3, each node 302 includes a processor 304 and a memory 306. Generally, the processor 304 and memory 306 in each node 302 are implemented in hardware, i.e., using corresponding integrated circuitry, discrete circuitry, and/or devices. For example, in some embodiments, the processor 304 and memory 306 in each node 302 are implemented in integrated circuitry on one or more semiconductor chips, are implemented in a combination of integrated circuitry on one or more semiconductor chips in combination with discrete circuitry and/or devices, or are implemented in discrete circuitry and/or devices. In some embodiments, the processor 304 and/or memory 306 in some or all of the nodes 302 perform operations for or associated with distributing model data that meets one or more predetermined conditions between memories 306 in nodes 302 as described herein.

The processor 304 in each node 302 is a functional block that performs computational, memory access, and other operations (e.g., control operations, configuration operations, etc.). For example, each processor 304 can be or include one of a central processing unit (CPU), a graphics processing unit (GPU), an accelerated processing unit (APU) or system on a chip (SOC), a field programmable gate array (FPGA), etc.

The memory 306 in each node 302 is a functional block that performs operations of a memory for storing data for accesses by processors 304 in the nodes 302. Each memory 306 includes volatile and/or non-volatile memory circuits (e.g., fifth-generation double data rate synchronous DRAM (DDR5 SDRAM)) for storing data, as well as control circuits for handling accesses of the data stored in the memory circuits, performing control or configuration operations, etc. As described herein, the memories 306 in some or all of the nodes 302 store model data for use in processing instances of input data through a model (e.g., model 100, etc.).

In some embodiments, the memory 306 in some or all of the nodes 302 is shared by and therefore available for accesses by functional blocks in other nodes 302. For example, in some embodiments, an overall "memory" of electronic device 300, which is accessible by processors 304 in all nodes 302, includes the individual memories 306 in each node 302, so that a total capacity of memory (in terms of bytes) in electronic device 300 is equal to a sum of the capacity of the memory 306 in each node 302. In some of these embodiments, memory 306 in each node 302 is assigned a separate portion of a range of addresses for the full memory, so that a memory 306 in a first node 302 includes memory in the address range 0-M, a memory 306 in a second node 302 includes memory in the address range M+1-K, etc., where M and K are address values and M<K.

Communication fabric 308 is a functional block that performs operations for communicating data between other functional blocks in electronic device 300 via one or more communication channels. Communication fabric 308 is coupled to or includes wires, guides, traces, wireless communication channels, transceivers, control circuits, antennas, etc., that are used for communicating the data. In some embodiments, communication fabric 308 is or includes one or more a wired and/or wireless networks external to the nodes 302, such as an Ethernet communication fabric, a network operating in accordance with the IEEE 802.11 wireless standard, etc. In some embodiments, when accessing a remote memory in another node 302, a processor in a given node 302 accesses the remote memory via communication fabric 308.

Controller 310 is a functional block that performs operations for handling model data in electronic device 300 and possibly other operations. Controller 310 is implemented in hardware, i.e., using corresponding integrated circuitry, discrete circuitry, and/or devices. For example, in some embodiments, controller 310 is implemented in integrated circuitry on one or more semiconductor chips, is implemented in a combination of integrated circuitry on one or more semiconductor chips in combination with discrete circuitry and/or devices, or is implemented in discrete circuitry and/or devices. In some embodiments, controller is or includes a system management unit, a dedicated model data controller, a microcontroller, a CPU or GPU core, an ASIC, and/or another functional block. In some embodiments, among the operations performed by the circuitry in controller 310 for handling the model data are operations for identifying particular model data that meets one or more predetermined conditions and copying (i.e., causing nodes 302 to copy) the particular model data from memories 306 in some or all of the nodes 302 to memories 306 in other nodes 302. In some embodiments, controller 310 includes dedicated and/or purpose specific circuitry (e.g., integrated circuitry and/or discrete circuitry) that performs the operations herein described—such as logic circuitry, processing circuitry, etc. In these embodiments, given the inputs described herein, the dedicated/purpose specific circuitry performs the described operations and/or produces the described results.

Although electronic device 300 is shown in FIG. 3 with a particular number and arrangement of functional blocks and devices, in some embodiments, electronic device 300 includes different numbers and/or arrangements of functional blocks and devices. For example, in some embodiments, electronic device 300 includes a different number of nodes 302. In addition, although each node 302 is shown with a given number and arrangement of functional blocks, in some embodiments, some or all nodes 302 include a different number and/or arrangement of functional blocks. Also, although as single separate controller 310 is shown in electronic device 300, in some embodiments, electronic device includes no controller 310 or includes multiple controllers (e.g., a system management unit or dedicated model data controller in each node 302, etc.). In embodiments without a controller 310, the operations described herein as performed by controller 310 are performed by other functional blocks, such as processors 304 in one or more nodes 302. Generally, in the described embodiments, electronic device 300 and processor 302 include sufficient numbers and/or arrangements of functional blocks to perform the operations herein described.

Electronic device 300 is simplified for illustrative purposes. In some embodiments, however, electronic device 300 and/or nodes 302 include additional or different functional blocks, subsystems, elements, and/or communication paths. For example, electronic device 300 and/or nodes 302 may include display subsystems, power subsystems, input-output (I/O) subsystems, etc. Electronic device 300 and/or nodes 302 generally include sufficient functional blocks, etc. to perform the operations herein described. In addition, although four nodes 302 are shown in FIG. 3, in some embodiments, a different number of nodes 302 is present—as shown by the ellipses in FIG. 3.

Electronic device 300 and/or nodes 302 can be, or can be included in, any device that performs computational operations. For example, electronic device 300 and/or one or more nodes 302 can be, or can be included in, a desktop computer, a laptop computer, a wearable computing device, a tablet computer, a piece of virtual or augmented reality equipment, a smart phone, an artificial intelligence (AI) or machine learning device, a server, a network appliance, a toy, a piece of audio-visual equipment, a home appliance, a vehicle, etc., and/or combinations thereof. In some embodiments, electronic device 300 is or includes a circuit board to which multiple nodes 302 are mounted or connected and communication fabric 308 is an inter-node communication route. In some embodiments, electronic device 300 includes a set or group of computers (e.g., a group of server computers in a data center, etc.), with one or more computers per node 302, the computers in the nodes and the nodes being coupled together via a wired or wireless inter-computer communication fabric 308. In some embodiments, electronic device 300 is included on one or more semiconductor chips. For example, in some embodiments, electronic device 300 is entirely included in a single "system on a chip" (SOC) semiconductor chip, is included on one or more ASICs, etc.

Predetermined Conditions

In the described embodiments, model data that meets one or more predetermined conditions is copied from local memories in nodes to local memories in other nodes, thereby distributing/replicating the model data among the other nodes so that some or all of the other nodes have copies of the model data stored locally. Generally, the one or more predetermined conditions include conditions under which the costs for copying model data to the other nodes (i.e., transmitting and storing the model data) are exceeded by the benefits of having the copies of the model data stored in the local memories in the other nodes—and therefore locally accessible. For example, in some embodiments, a predetermined condition is a frequency of access of the model data. In some of these embodiments, model data (e.g., rows of embedding table 112 in an embodiment that uses model 100) that is accessed more than a threshold amount is distributed among the other nodes. As another example, in some embodiments, a predetermined condition includes metadata associated with model data (e.g., rows of embedding table 112 in an embodiment that uses model 100) being set to specified values, such as identifying (or not identifying) the model data as having a given importance for processing instances of input data through the model or identifying model data as to be copied to other nodes. In some of these embodiments, a programmer, application program, and/or other entity can set and/or reset the metadata for model data to identify model data that should be distributed among the other nodes. As yet another example, in some embodiments, a predetermined condition includes the internal content of model data, i.e., model data that includes or is associated with specified values. For instance, model data that is known to be more pertinent to instances of input data being processed through the model, etc. As yet another example, in some embodiments, a predetermined condition includes a tendency to (or not to) change of the model data. In some of these embodiments, pieces of model data can be dynamically updated as information is fed back into the model and pieces of model data that are not changing and/or are changing more slowly can be more likely to be copied among the other nodes.

Distributing Model Data Among Nodes

Figure 4:
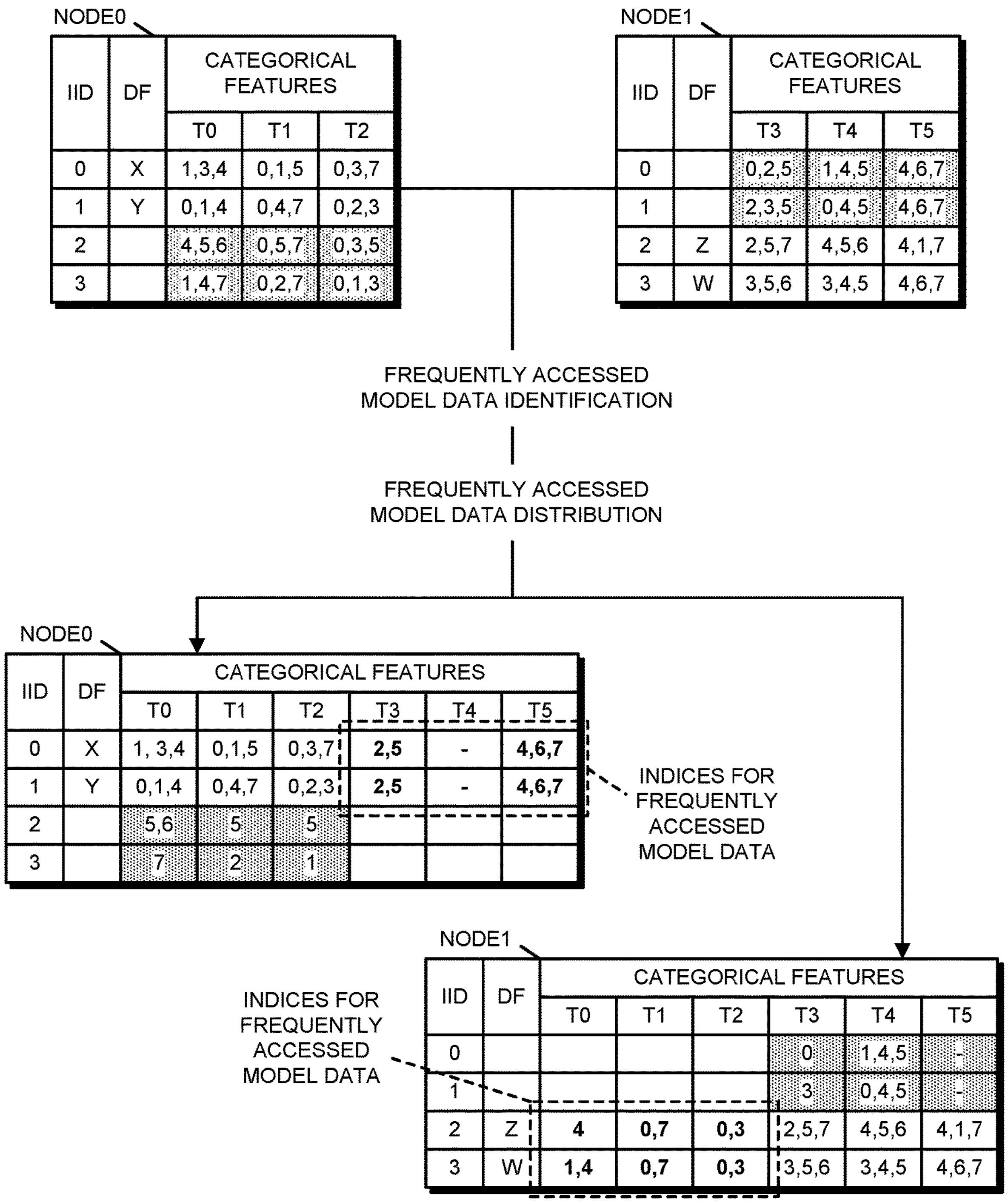
FIG. 4 presents a block diagram illustrating a distribution of model data that meets one or more predetermined conditions in nodes and model data used when processing instances of input data in the nodes in accordance with some embodiments.

In the described embodiments, a separate portion of model data for a model is stored in a memory in nodes in an electronic device having multiple nodes (e.g., memories 306 in nodes 302 in electronic device 300). A controller in the electronic device (e.g., controller 310, a processor 304 in one or more of nodes 302, etc.) performs operations for distributing model data that meets one or more predetermined conditions from memories, or "local memories," in some or all of the nodes to local memories in other nodes. FIG. 4 presents a block diagram illustrating a distribution of model data that meets one or more predetermined conditions in nodes and model data used when processing instances of input data in the nodes in accordance with some embodiments. In other words, FIG. 4 shows the model data that is present in each node, along with identifying the particular model data used by the nodes either for processing that node's own instances of input data or for processing the other node's instances of input data. For example, the rows in each of nodes0-1 show the indices in embedding table 112 that are accessed either for processing that node's own instances of input data or for processing other the node's instances of input data.

For the operations in FIG. 4, it is assumed that the predetermined condition under which model data is distributed among the nodes is frequency of access of model data. In other words, model data that is determined to be frequently accessed is copied between local memories in the nodes. For the remainder of the description of FIG. 4, therefore, the model data that meets the predetermined condition is called "frequently accessed model data." Note, however, that one or more additional or other predetermined conditions can be used in some embodiments. In addition, for the operations in FIG. 4, it is assumed that separate portions of the model data for model 100 from FIG. 1 have already been distributed among the nodes (similarly to the distribution of model data among the nodes described for FIG. 2). In other words, a full copy of model data for multilayer perceptron 106 is stored in the local memory in each node. In addition, a portion of the model data for embedding table 112 is stored in the local memory in each node, with tables T0-T2—each of which includes a subset of the rows in embedding table 112—stored in the local memory in node0 and tables T3-T5 stored in the local memory in node1. This state of the model data is shown the top of FIG. 4, above the frequently accessed model data identification label. In this state for the model data, if the model data was to be used for processing instances of input data through the model, node0 would need to perform remote memory accesses to access rows (i.e., model data) in tables T3-T5 and node1 would need to perform remote memory accesses for accessing rows in tables T0-T2—or the controller would need to cause each of nodes0-1 to communicate the rows from tables T0-T2 or tables T3-T5—or data based thereon, e.g., by combining two or more rows into a combined row, respectively, to the other node.

Although for the example in FIG. 4 it is assumed that the separate portions of the model data have already been distributed among the nodes, in some embodiments, the separate portions of the model data are not distributed among the nodes before the frequently accessed model data is identified and distributed. In other words, in these embodiments, tables T0-T2 are not stored in the local memory in node0 and tables T3-T5 are not stored in the local memory in node1 before the frequently accessed model data is identified and distributed among the nodes as described for FIG. 4. For example, for statically distributing model data, the controller may logically separate the model data among the nodes (without actually storing model data in the nodes), determine frequently accessed model data, and then perform a single distribution operation to arrive at the final distribution state of the model data and frequently accessed model data shown in the bottom of FIG. 4 (i.e., with node0 having tables T0-T2 and frequently accessed rows from tables T3-T5 stored in node0's local memory, etc.). In these embodiments, a single distribution operation (i.e., series of memory writes) is performed for the model data to result in the model data and frequently accessed model data being stored in the memories in nodes0-1 as shown. In some embodiments, the static distribution is performed at a different time and/or on a different electronic device, such as when the model is developed by a developer, when the instances of input data are selected, etc. In some of these embodiments, the static distribution results in a listing or record identifying how model data and frequently accessed model data are to be distributed among the nodes that is subsequently used for distributing the model data and frequently accessed model data among the nodes.

As can be seen via the labels in FIG. 4, the controller identifies frequently accessed model data and then distributes the frequently accessed model data among nodes0-1. Generally, identifying the frequently accessed model data involves the controller determining, from among the model data in tables T0-T5, model data that was (or will be) accessed more than a threshold number of times by nodes when processing instances of input data through the model. For example, the controller can keep one or more counts of accesses (e.g., a counter per piece of model data, a Bloom filter, etc.), monitor communications on a communication fabric (thereby counting remote memory accesses for model data), etc. in order to determine the number of accesses—and can compare the number of accesses to a threshold to identify frequently accessed model data. Distributing the frequently accessed model data includes copying particular pieces of frequently accessed model data (e.g., individual rows of embedding table 112) from the local memory in a given node to local memory in the other node. For example, in some embodiments, the controller causes the nodes to perform one or more remote writes to write the frequently accessed model data from a local memory in the nodes to the local memory in each other node via a communication fabric (e.g., communication fabric 308). For the example in FIG. 4, the following indices in the respective table (and thus the corresponding rows) are identified as frequently accessed model data by the controller and copied from the respective node to the other node:

- Table T0—indices 1 and 4 (the rows at indices 5, 6, and 7 are not frequently accessed)
- Table T1—indices 0 and 7 (the rows at indices 5 and 2 are not frequently accessed)
- Table T2—indices 0 and 3 (the rows at indices 5 and 1 are not frequently accessed)
- Table T3—indices 2 and 5 (the rows at indices 0 and 3 are not frequently accessed)
- Table T4—none (the rows at indices 0, 1, 4, and 5 are not frequently accessed)
- Table T5—indices 4, 6, and 7 (all rows are frequently accessed)

For the example in FIG. 4, only accessed indices are shown for clarity. In some embodiments, however, rows of embedding table 112 associated with other indices can be stored in the local memories of nodes0-1.

Although frequently accessed model data is described for the example in FIG. 4 as being copied from a local memory in each node to a local memory in the other node, the described embodiments are not limited to memory-to-memory copies. In some embodiments, one or both of nodes0-1 includes a separate cache memory into which some or all of the frequently accessed model data is copied—and thus the frequently accessed model data is copied from a local memory in a given node to the cache memory in the other node. For example, assuming an embodiment in which some or all of the nodes include a hierarchy of cache memories (e.g., the well known hierarchy including a level-one (L1) cache memory, a level-two (L2) cache memory, and a level-three (L3) cache memory), the frequently accessed model data can be stored in one (or more) of the cache memories in the hierarchy of cache memories. As another example, in some embodiments, a dedicated frequently accessed model data cache memory is included in one or both of nodes0-1 and the frequently accessed model data is stored in the dedicated frequently accessed model data cache memory. In some embodiments, the frequently accessed model data always stored in a cache memory in one or both of nodes0-1 (and not the local memory as described for the example in FIG. 4).

After the frequently accessed model data has been distributed, each of the nodes includes model data from tables for which the nodes did not previously include model data (i.e., tables for which the model data was not initially present in the nodes). The nodes are therefore able to access copies of frequently accessed model data stored in their own local memories (unlike what is shown in the initial distribution at the top of FIG. 4). This can be seen in the expanded listing of tables in each node in the lower part of FIG. 4—i.e., node0 includes additional listings for tables T3-T5, etc. As can be seen in the listing of indices processed in each node, node0 can process indices 2 and 5 in table T3 using the copy of frequently accessed model data in the local memory in node0, although node0 will still need to acquire/receive the row at index 0 in table T3 from node1. In addition, node0 can process indices 4, 6, and 7 in table T5 using the copy of frequently accessed model data in the local memory in node0—and will not need to receive/acquire any row from table T5 from node1. Because table T4 included no frequently accessed model data, Node0 will need to receive/acquire the rows at indices 1, 4, and 5 from table T4 from node1.

Processing each instance of input data through the model includes processing respective dense features through multilayer perceptron 106 and performing an embedding table 112 lookup for locations in each of tables T0-T5. For example, node0 processes instance of input data 0's dense features X through multilayer perceptron 106 and performs lookups in tables T0-T5 for the indices shown in FIG. 4 (e.g., indices 1, 3, and 4 in T0; 0, 1, and 5 in T1, etc.). The lookups in tables T0-T2 can be performed using data acquired from the local memory in node 0. In addition, some of the lookups in tables T3-T5 can be performed using copies of frequently accessed model data acquired from the local memory in node 0. That is, node0 can access copies of frequently accessed model data at indices 2 and 5 in table T3 and 4, 6, and 7 in table T5 in the local memory in node0. Because the copies of model data from the remaining indices in tables T3-T5 are not stored in node0's local memory (and are assumed not to be frequently accessed model data for the example in FIG. 4), node0 sends a remote memory access request to node1 for the data in tables T3-T5 at the identified indices, i.e., indices 0 in table T3 and 1, 4, and 5 in table T4 (the indices/rows of tables T3-T5 accessed by node0 are shown as shaded in node1 in FIG. 4). Node0 performs similar operations for instance of input data 1. Node1 also performs similar operations for instances of input data 2-3, including corresponding remote memory accesses for reading data from tables T0-T2 in node0 (also shown as shaded in FIG. 2) that is not frequently accessed model data and thus was not copied to the local memory in node1.

Although model 100 is used for describing FIG. 4, in some embodiments model 100 is not the model used for processing instances of input data. Generally, in the described embodiments, any model can be used for which model data is initially distributed among the nodes in accordance with model parallelism—i.e., so that each node includes a separate portion of the model data in a local memory. In other words, the described embodiments can identify frequently accessed model data and copy the frequently accessed model data from local memories in nodes to local memories in other nodes as described herein for any sort of model.

Although nodes0-1 are described as performing remote memory accesses to acquire model data (i.e., rows of embedding table 112) from the other node, in some embodiments, the nodes themselves do not perform the remote memory accesses. For example, in some embodiments, the controller assists the nodes by distributing memory accesses to the nodes in which model data is located—so that each of the nodes automatically sends needed model data to the other node (e.g., via an all-to-all communication on the communication fabric, etc.). In these embodiments, the nodes will receive needed model data from the other nodes without themselves performing a corresponding remote memory access.

Although individual pieces of frequently accessed model data (e.g., rows of embedding table 112) are described as being acquired from other nodes' local memories for FIG. 4, in some embodiments, other forms of data are acquired. For example, in some embodiments, pieces of frequently accessed model data are combined together before being communicated from other nodes, such as by combining two or more rows of embedding table 112 into a single combined row, etc.

Process for Distributing Model Data Among Nodes

Figure 5:
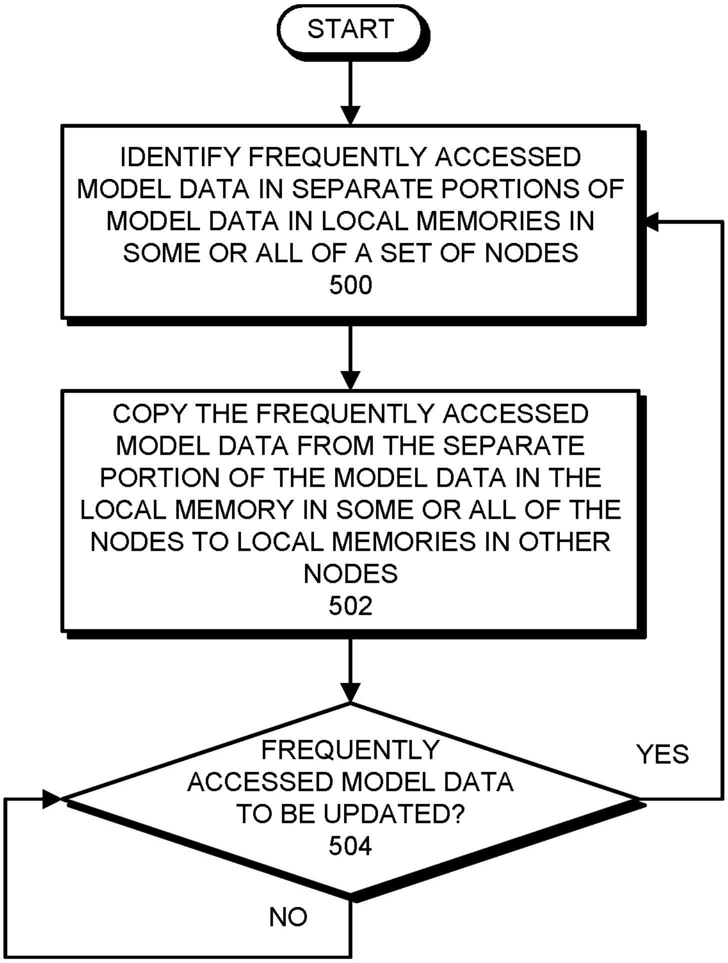
FIG. 5 presents a flowchart illustrating a process for distributing model data that meets one or more predetermined conditions among nodes in an electronic device in accordance with some embodiments.

In the described embodiments, nodes in an electronic device (e.g., nodes 302 in electronic device 300) perform operations for processing instances of input data through a model (e.g., model 100). As part of performing the operations for processing the instances of input data, the nodes use model data (i.e., information that describes, enumerates, and identifies arrangements or properties of internal elements of a model) for processing the instances of input data through the model. For example, assuming that embedding table 112 is the model data, the nodes can perform lookups in embedding table 112 to acquire values associated with corresponding patterns in categorical features (e.g., categorical features 110). At least some of the model data is initially distributed among the nodes in a model parallel scheme, with each node storing a separate portion of the model data in that node's local memory. For example, continuing with the example of embedding table 112 as the model data, each node can store separate blocks of embedding table 112 (each including respective rows of embedding table 112) in a local memory in that node. A controller in the device (e.g., controller 310, a processor 304 in one of the nodes, etc.) performs operations for distributing model data that meets one or more predetermined conditions among the nodes. FIG. 5 presents a flowchart illustrating a process for distributing model data that meets one or more predetermined conditions among nodes in accordance with some embodiments. FIG. 5 is presented as a general example of operations performed in some embodiments. In other embodiments, however, different operations are performed and/or operations are performed in a different order. For example, in some embodiments, only steps 500-502 are performed—and there is no update to the model data as in step 504. Additionally, although certain elements are used in describing the process (e.g., a memory controller, etc.), in some embodiments, other elements perform the operations.

For the operations in FIG. 5, it is assumed that the predetermined condition under which model data is distributed among the nodes is frequency of access of model data. In other words, model data that is determined to be frequently accessed is copied between local memories in the nodes. For the remainder of the description of FIG. 5, therefore, the model data that meets the predetermined condition is called "frequently accessed model data." Note, however, that one or more additional or other predetermined conditions can be used in some embodiments.

The process shown in FIG. 5 starts when the controller identifies frequently accessed model data in separate portions of model data in local memories in some or all of the nodes in the electronic device (step 500). For this operation, the controller (and/or another entity) computes, estimates, tracks, and/or acquires information about accesses of model data that have been or will be performed for processing instances of input data through a model. For example, the controller can statically compute or estimate a number of accesses of model data based on the model data and the internal arrangement of the model, prior accesses of model data for similar models, input from one or more developers, and/or other information. As another example, the controller can dynamically compute or estimate a number of accesses of model data based on accesses of model data in the local memories in each of the nodes, remote memory accesses for model data between the nodes, instances of input data being processed in the model, and/or other information. The controller then determines particular model data among all of the model data that is frequently accessed model data by comparing the information about the accesses of model data to a threshold. When a number of accesses of a given piece of model data (e.g., an individual row of embedding table 112) is higher than the threshold, the controller can identify the given piece of model data as frequently accessed model data.

In some embodiments, the above described threshold is set in such a way that a desired amount of the model data is identified as frequently accessed model data. For example, in some embodiments, the threshold is set based at least in part on an average or other percentile number of accesses of individual pieces of model data. For instance, the threshold can be set at the 95th percentile of accesses of model data (or an estimated value thereof)—so that 5% of model data is considered frequently accessed model data. As another example, in some embodiments, the threshold is set based at least in part on a capacity of some or all of the nodes for storing copies of frequently accessed model data, such as an available number of memory locations (or cache memory locations) for storing frequently accessed model data. As yet another example, in some embodiments, the threshold is set based at least in part on a number of remote memory accesses for accessing model data in the communication fabric. In some of these embodiments, a combination of multiple factors, possibly including some or all of the factors listed above, are used for setting the threshold.

The controller then copies the frequently accessed model data from the separate portion of the model data in some or all of the nodes to local memories in other nodes (step 502). For this operation, the controller causes the nodes (or another entity, such as a direct memory access engine) to copy the individual pieces of frequently accessed model data from their own memories to other nodes' memories, or vice versa. For example, in some embodiments, the controller causes each of the nodes that stores frequently accessed model data (not all nodes necessarily store frequently accessed model data) to perform a broadcast, or one-to-many, write of the frequently accessed model data to all other nodes (or to a selected subset of the other nodes). As another example, in some embodiments, the controller causes each of the nodes to request frequently accessed model data from other nodes that store frequently accessed model data. After this operation is complete, the nodes store frequently accessed model data similarly to the arrangement of model data described above for FIG. 4, i.e., each node stores individual pieces of frequently accessed model data in the local memory.

The controller then determines whether the frequently accessed model data is to be updated (step 504). For this operation, the controller updates the frequently accessed model data when a specified event occurs. For example, the controller may update the frequently accessed model data each time that a timer expires or when a given time has passed, when a specified number of instances of input data have been processed, upon receiving a request to update the frequently accessed model data (e.g., from a processor), when a number of remote memory accesses detected on the communication fabric for accessing model data exceeds a first threshold and/or falls below a second threshold, etc. When the frequently accessed model data is to be updated (step 504), the controller returns to step 500. Otherwise, when the frequently accessed model data is not to be updated, i.e., when the specified event has not yet occurred (step 504), the controller returns to step 504. As described above, in some embodiments, step 504 is not performed—and thus the frequently accessed model data is distributed only a single time.

Process for Accessing Model Data Using Remote Memory Accesses from Nodes

Figure 6:
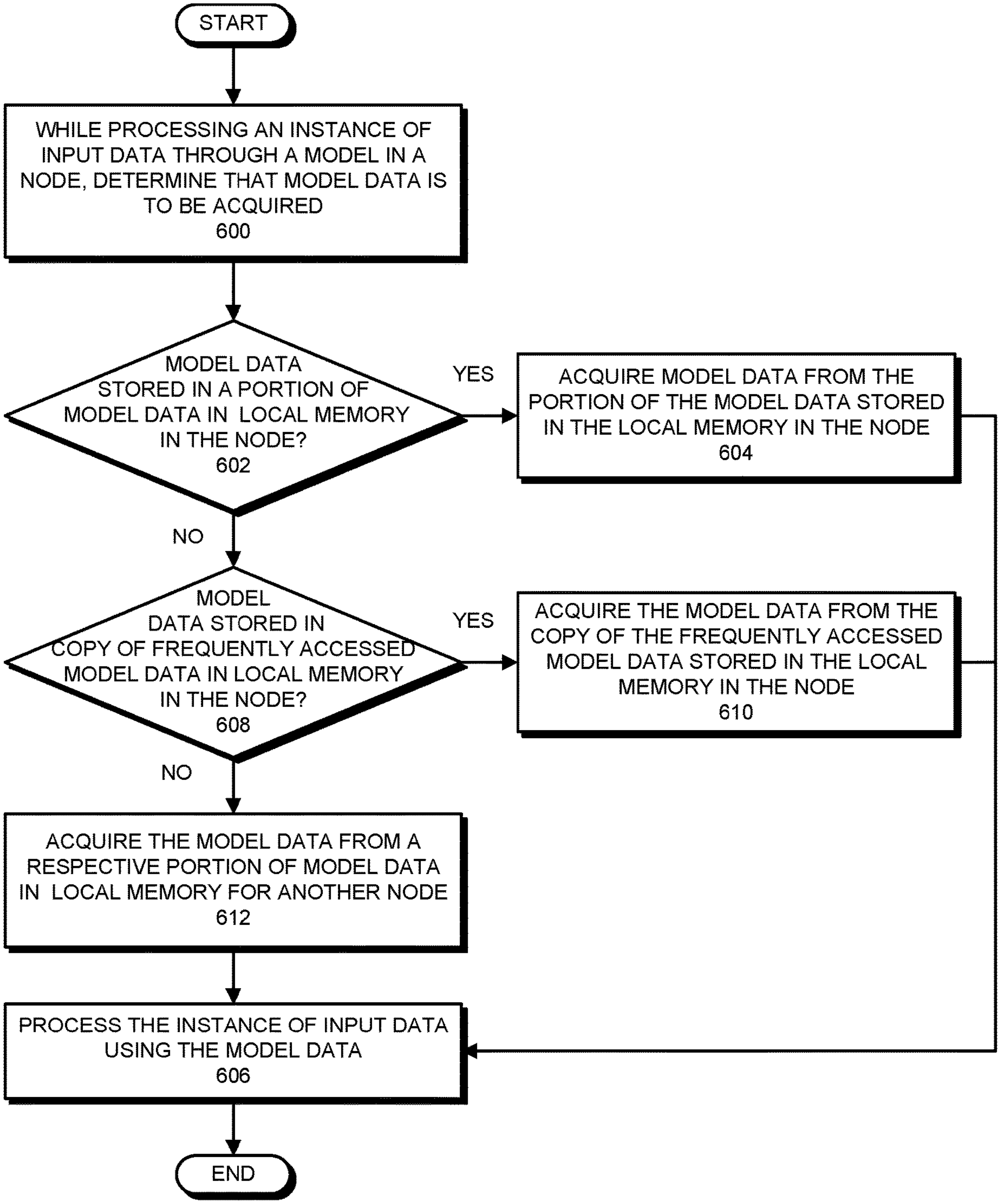
FIG. 6 presents a flowchart illustrating a process for accessing model data when processing instances of input data through a model in accordance with some embodiments.

In the described embodiments, nodes in an electronic device (e.g., nodes 302 in electronic device 300) perform operations for processing instances of input data through a model (e.g., model 100). As part of performing the operations for processing the instances of input data, the nodes use model data (i.e., information that describes, enumerates, and identifies arrangements or properties of internal elements of a model) for processing the instances of input data through the model. For example, assuming that embedding table 112 is the model data, the nodes can perform lookups in embedding table 112 to acquire values associated with corresponding patterns in categorical features (e.g., categorical features 110). FIG. 6 presents a flowchart illustrating a process for accessing model data when processing instances of input data through a model in accordance with some embodiments. FIG. 6 is presented as a general example of operations performed in some embodiments. In other embodiments, however, different operations are performed and/or operations are performed in a different order. Additionally, although certain elements are used in describing the process (e.g., a memory controller, etc.), in some embodiments, other elements perform the operations.

For the operations in FIG. 6, it is assumed that the predetermined condition under which model data is distributed among the nodes is frequency of access of model data. In other words, model data that is determined to be frequently accessed is copied between local memories in the nodes. For the remainder of the description of FIG. 6, therefore, the model data that meets the predetermined condition is called "frequently accessed model data." Note, however, that one or more additional or other predetermined conditions can be used in some embodiments.

The process shown in FIG. 6 starts when a node, while processing an instance of input data through a model, determines that model data is to be acquired (step 600). For this operation, the node, while processing the instance of input data, is to use the model data for processing the instance of input data. For example, assuming that model 100 is the model, while performing table lookup, the node can determine that a row of embedding table 112 is to be used for processing the instance of input data (e.g., based on a value of a particular categorical feature 110).

The node then acquires the model data from a local memory either in the node itself or in another node. Generally, the node preferentially acquires the model data from the node's own local memory, but resorts to acquiring the data from another node via the communication fabric when the model data is not available in the node's own local memory. When the model data is stored in a portion of the model data in the local memory in the node (step 602), therefore, the node acquires the model data from the portion of the model data stored in the local memory in the node (step 604). In other words, when the model data was included in the separate portion of the model data that was initially (or otherwise) stored in the local memory in the node, the node acquires the model data from the separate portion of the model data. The node then processes the instance of the input data using the model data (step 606). For this operation, continuing the embedding table 112 example, the node acquires the row of embedding table 112 from the separate portion of the model data stored in the local memory in the node and uses the row of embedding table as the output for table lookup. Information from the row of the embedding table (or a value generated based thereon) is therefore sent to combination 114 to be combined with an output of multilayer perceptron 106 from processing corresponding dense features in order to generate an intermediate value to be sent for processing in multilayer perceptron 116.

When the model data is not stored in the portion of the model data in the local memory in the node (step 602), but is stored in the copy of frequently accessed model data that is stored in the local memory in the node (step 608), the node acquires the model data from the copy of the frequently accessed model data stored in the local memory in the node (step 610). In other words, when the model data is frequently accessed model data that was copied to the node's local memory from another node's local memory (e.g., as described for FIG. 5), the node acquires the model data from the copy of the frequently accessed model data in the node's local memory. The node then processes the instance of the input data using the model data (step 606), as described above.

When the model data is not stored in either the portion of the model data or the copy of the frequently accessed model data in the local memory in the node (steps 602 and 608), the model data is not stored in the local memory in the node. The node therefore acquires the model data from a respective portion of the model data in the local memory in another node (step 612). For this operation, the node sends a remote memory access (e.g., read request) for the model data to the other node (and may simply broadcast a request for the model data to all nodes) via the communication fabric. Upon receiving the model data from the other node, the node processes the instance of the input data using the model data (step 606), as described above.

Process for Accessing Model Data Via Access Requests from a Controller

As described above for FIG. 6, as part of performing operations for processing the instances of input data, the nodes use model data for processing the instances of input data through the model. For the example in FIG. 6, the nodes themselves request data from other nodes, i.e., perform remote memory accesses in other nodes, as described for step 612. In some embodiments, however, the nodes themselves do not perform remote memory accesses for acquiring model data from other nodes. Instead, in these embodiments, a controller assists the nodes in acquiring model data needed for processing instances of input data through the model. In these embodiments, the controller sends specified operations to acquire model data (e.g., lookups in embedding table 112) to the nodes for processing by the nodes based on a record of the model data that is stored in local memories in each of the nodes. The controller sends the specified operations to particular nodes so that the specified operations are preferentially sent to nodes that are processing instances of input data and have the necessary model data stored in their local memories. In other words, the controller, to the extent possible, keeps the specified operations on nodes that are processing corresponding instances of input data. When the nodes that are processing the instances of input data do not have the necessary model data stored in the local memories, however, the controller falls back to sending the specified operations to other nodes that have the necessary model data stored in their local memories. Generally, in these embodiments, the controller keeps a record of model data stored in the local memory in each node (i.e., in the portion of the model data and/or the copies of the model data that meet one or more predetermined conditions stored in each node's local memory). The controller determines, based on the record, a distribution of operations among the nodes for processing instances of input data so that the operations for processing the instances of input data will be performed using model data stored in local memories in the nodes. The controller then distributes the operations for processing instances of input data among the nodes based on the distribution of operations.

As an example of the controller assisting the nodes in acquiring model data, assume an embodiment in which a first node is processing an instance of input data for which a number of indices are to be looked up in embedding table 112—and thus for which information from the number of rows of embedding table 112 are to be used for processing the instance of input data. In some embodiments, the controller determines, using a record of rows of embedding table 112 stored in the local memory in each node (e.g., a Bloom filter that was generated as portions of embedding table were distributed among the nodes), local memories in nodes where corresponding rows of embedding table 112 are stored for each of the indices. This includes the rows in the portion of embedding table 112 and the copies of the rows of embedding table 112 that meet the one or more predetermined conditions stored in each node's local memory. The controller then sends a request to perform a lookup in embedding table 112 to the first node for each index/row that is stored in the local memory in the first node. The controller also sends a request to perform a lookup in embedding table 112 to respective other nodes for each index/row that is not stored in the local memory in the first node (and therefore cannot be acquired locally by the first node). The other nodes perform corresponding lookups in embedding table 112 and return the resulting rows of embedding table 112—or data that is generated based thereon, such as a combined row that is generated by combining two or more requested rows—to the first node. The first node uses the rows of embedding table 112 received from the other nodes along with rows of embedding table 112 acquired during the first node's own lookups to perform subsequent operations for processing the instance of input data.

Model Data Distribution for Training Models

In the examples above, instances of input data are processed through a model to generate an output from the model. For example, instances of input data can be processed through model 100 to generate a ranked list of items to be presented as recommendations to a user. In some embodiments, however, model data that meets one or more predetermined conditions is distributed among local memories in nodes for other purposes. For example, in some embodiments, model data that meets the one or more predetermined conditions (e.g., frequently accessed model data, etc.) is distributed among nodes for training operations for a model. Training often involves an iterative scheme in which instances of input data having expected outputs are processed through the model to generate actual outputs, error/loss values are computed based on the actual outputs versus expected outputs, and the error/loss values are backpropagated through the model to correct or update model data. Similarly to the examples above, for training, separate portions of model data can be distributed among local memories in nodes in an electronic device (i.e., in accordance with model parallelism). Before or during training, a controller (or another entity) can identify model data that meets the one or more predetermined conditions and copy model data that meets the one or more predetermined conditions from local memories in some or all of the nodes to local memories in other nodes. In this way, model data that meets the one or more predetermined conditions can be used for the training operations by nodes without performing remote memory accesses. Generally, in the described embodiments, model data that meets one or more predetermined conditions can be distributed among the nodes in electronic devices for all operations of models.

In some embodiments, at least one electronic device (e.g., electronic device 300, etc.) or some portion thereof uses code and/or data stored on a non-transitory computer-readable storage medium to perform some or all of the operations described herein. More specifically, the at least one electronic device reads code and/or data from the computer-readable storage medium and executes the code and/or uses the data when performing the described operations. A computer-readable storage medium can be any device, medium, or combination thereof that stores code and/or data for use by an electronic device. For example, the computer-readable storage medium can include, but is not limited to, volatile and/or non-volatile memory, including flash memory, random access memory (e.g., DDR5 DRAM, SRAM, eDRAM, etc.), non-volatile RAM (e.g., phase change memory, ferroelectric random access memory, spin-transfer torque random access memory, magnetoresistive random access memory, etc.), read-only memory (ROM), and/or magnetic or optical storage mediums (e.g., disk drives, magnetic tape, CDs, DVDs, etc.).

In some embodiments, one or more hardware modules perform the operations described herein. For example, the hardware modules can include, but are not limited to, one or more central processing units (CPUs)/CPU cores, graphics processing units (GPUs)/GPU cores, application-specific integrated circuit (ASIC) chips, field-programmable gate arrays (FPGAs), compressors or encoders, encryption functional blocks, compute units, embedded processors, accelerated processing units (APUs), controllers, requesters, completers, network communication links, and/or other functional blocks. When circuitry (e.g., integrated circuit elements, discrete circuit elements, etc.) in such hardware modules is activated, the circuitry performs some or all of the operations. In some embodiments, the hardware modules include general purpose circuitry such as execution pipelines, compute or processing units, etc. that, upon executing instructions (e.g., program code, firmware, etc.), performs the operations. In some embodiments, the hardware modules include purpose-specific or dedicated circuitry that performs the operations "in hardware" and without executing instructions.

In some embodiments, a data structure representative of some or all of the functional blocks and circuit elements described herein (e.g., electronic device 300 or some portion thereof) is stored on a non-transitory computer-readable storage medium that includes a database or other data structure which can be read by an electronic device and used, directly or indirectly, to fabricate hardware including the functional blocks and circuit elements. For example, the data structure may be a behavioral-level description or register-transfer level (RTL) description of the hardware functionality in a high-level design language (HDL) such as Verilog or VHDL. The description may be read by a synthesis tool which may synthesize the description to produce a netlist including a list of transistors/circuit elements from a synthesis library that represent the functionality of the hardware including the above-described functional blocks and circuit elements. The netlist may then be placed and routed to produce a data set describing geometric shapes to be applied to masks. The masks may then be used in various semiconductor fabrication steps to produce a semiconductor circuit or circuits (e.g., integrated circuits) corresponding to the above-described functional blocks and circuit elements. Alternatively, the database on the computer accessible storage medium may be the netlist (with or without the synthesis library) or the data set, as desired, or Graphic Data System (GDS) II data.

In this description, variables or unspecified values (i.e., general descriptions of values without particular instances of the values) are represented by letters such as N, T, and X As used herein, despite possibly using similar letters in different locations in this description, the variables and unspecified values in each case are not necessarily the same, i.e., there may be different variable amounts and values intended for some or all of the general variables and unspecified values. In other words, particular instances of N and any other letters used to represent variables and unspecified values in this description are not necessarily related to one another.

The expression "et cetera" or "etc." as used herein is intended to present an and/or case, i.e., the equivalent of "at least one of" the elements in a list with which the etc. is associated. For example, in the statement "the electronic device performs a first operation, a second operation, etc.," the electronic device performs at least one of the first operation, the second operation, and other operations. In addition, the elements in a list associated with an etc. are merely examples from among a set of examples—and at least some of the examples may not appear in some embodiments.

The foregoing descriptions of embodiments have been presented only for purposes of illustration and description. They are not intended to be exhaustive or to limit the embodiments to the forms disclosed. Accordingly, many modifications and variations will be apparent to practitioners skilled in the art. Additionally, the above disclosure is not intended to limit the embodiments. The scope of the embodiments is defined by the appended claims.

What is claimed is:

1. An electronic device, comprising:
a plurality of nodes, each node comprising:
a processor with circuitry configured to process input data through a model; and
a local memory configured to store a portion of model data associated with the model; and
a controller comprising circuitry configured to:
copy, from the local memory of a first node to the local memory of a second node, a first subset of the portion of the model data, wherein the first subset is smaller than the portion of the model data, the copying is based on a measured access frequency for the first subset exceeding a threshold, and a remainder of the portion of the model data remains stored in the local memory of the first node; and
cause a processor of the second node to use the copied first subset of the portion of the model data to perform at least one operation that processes the input data through the model to generate output data, wherein the copying makes the first subset locally available to the second node without remote memory access.

2. The electronic device as recited in claim 1, wherein the controller is further configured to copy, from the local memory of the first node to the local memory of the second node, a second subset of the portion of the model data in place of the first subset based on a change in measured access frequency for the second subset exceeding the threshold.

3. The electronic device as recited in claim 1, wherein, while processing the input data through the model, the processor acquires model data stored in its local memory and acquires additional model data from other nodes when that data is not available locally, and uses the acquired model data to perform the processing.

4. The electronic device as recited in claim 1, wherein to copy a second subset of the portion of the model data from the local memory of the first node to the local memory of the second node, the controller is configured to overwrite the first subset responsive to a change in measured latency or access frequency for the second subset, and to perform the overwrite prior to the processor of the second node using the copied first subset to perform the at least one operation.

5. The electronic device as recited in claim 1, wherein the model data associated with the model comprises embedding table data used for training or inference.

6. The electronic device as recited in claim 1, wherein:
the portion of the model data stored in the local memory in each node includes at least one embedding table comprising a plurality of rows of the model data; and
the first subset includes individual rows identified as frequently accessed rows based on observed access statistics across input data batches.

7. The electronic device as recited in claim 1, wherein an amount of data in the first subset is based at least in part on:
an available capacity in the local memory of the second node for storing model data identified as being frequently accessed; and
an amount of communication between the first node and the second node for communicating the model data.

8. The electronic device as recited in claim 1, wherein the controller is further configured to copy a second subset of the portion of the model data from a local memory of a third node to a local memory of a fourth node while maintaining a remainder of the portion of the model data at the third node, responsive to the second subset satisfying one or more conditions comprising a prediction, based on historical usage statistics of training or inference iterations, that the second subset remains unchanged over the iterations.

9. A method comprising:
performing, by circuitry of each processor of a plurality of nodes, operations for processing input data through a model;
storing, by local memory of each of the plurality of nodes, a portion of model data associated with the model;
copying, by circuitry of a controller, a first subset of the portion of the model data from a local memory of a first node to a local memory of a second node, wherein the first subset is smaller than the portion of the model data, the copying is based on a measured access frequency for the first subset exceeding a threshold, and a remainder of the portion of the model data remains stored in the local memory of the first node; and
causing, by the controller, a processor of the second node to use the copied first subset of the portion of the model data for performing at least one operation that processes the input data through the model to generate output data, wherein the copying makes the first subset locally available to the second node without remote memory access.

10. The method as recited in claim 9, further comprising copying, from the local memory of the first node to the local memory of the second node, a second subset of the portion of the model data in place of the first subset based on a change in measured access frequency for the second subset exceeding the threshold.

11. The method as recited in claim 9, wherein the method further comprises at one or more times after copying the first subset of the portion of the model data from the local memory of the first node to the local memory of the second node:
copying, by the controller to the local memory of the second node, a second subset of the portion of the model data stored at the local memory of the first node, wherein the second subset comprises one or more rows identified as frequently accessed rows based on updated access information generated while processing instances of input data through the model, including overwriting the first subset of the portion of the model data copied at the local memory of the second node with the second subset.

12. The method as recited in claim 9, wherein local memories in the plurality of nodes have insufficient storage capacity for simultaneously storing all of the model data associated with the model.

13. The method as recited in claim 9, wherein:
the model is a computational model that comprises a deep learning recommendation model;
the portion of the model data stored in the local memory in each node includes at least one embedding table comprising a plurality of rows of model data; and
the first subset of the portion of the model data comprises one or more rows identified as frequently accessed rows.

14. The method as recited in claim 9, further comprising copying, by the controller, a second subset of the portion of the model data from a local memory of a third node to a local memory of a fourth node while maintaining a remainder of the portion of the model data at the third node, responsive to the second subset comprises one or more rows identified as frequently accessed rows.

15. The method as recited in claim 9, wherein an amount of the first subset of the portion of the model data is based at least in part on:

an available capacity for storing model data comprises one or more rows identified as frequently accessed rows; and an amount of communication between the first node and the second node for communicating the model data.

16. A controller comprising:

circuitry configured to:

distribute respective portions of a plurality of portions of model data to each of a plurality of nodes, each node comprising circuitry configured to perform operations for processing input data through a model and a local memory configured to store a portion of model data associated with the model;

copy, from the local memory of a first node to the local memory of a second node, a first subset of the portion of the model data, wherein the first subset is smaller than the portion of the model data, the copying is based on a measured access frequency for the first subset exceeding a threshold, and a remainder of the portion of the model data remains stored in the local memory of the first node; and cause circuitry of the second node to use the copied first subset of the portion of the model data to perform at least one operation that processes the input data through the model to generate output data, wherein the copying makes the first subset locally available to the second node without remote memory access.

17. The controller as recited in claim 16, wherein the circuitry is further configured to the controller is further configured to copy, from the local memory of the first node to the local memory of the second node, a second subset of the portion of the model data in place of the first subset based on a change in measured access frequency for the second subset exceeding the threshold.

18. The controller as recited in claim 16, wherein the circuitry is configured to, at one or more times after copying the first subset of the portion of the model data from the local memory of the first node to the local memory of the second node:

copy, to the local memory of the second node, a second subset of the portion of the model data stored at the local memory of the first node identified as being frequently accessed, wherein to copy the second subset, the circuitry is configured to overwrite the first subset of the portion of the model data copied at the local memory of the second node, prior to the second node using the copied first subset for performing the at least one operation.

19. The controller as recited in claim 16, wherein local memories in the plurality of nodes have insufficient storage capacity for simultaneously storing all of the model data associated with the model.

20. The controller as recited in claim 16, wherein:

the model is a computational model that comprises a deep learning recommendation model;

the respective portion of the model data stored in the local memory in each node includes at least one embedding table comprising a plurality of rows of model data; and the first subset of the portion of the model data includes individual rows of model data in the embedding table.

21. The controller as recited in claim 16, wherein the circuitry is configured to copy a second subset of the portion of the model data from a local memory of a third node to a local memory of a fourth node while maintaining a remainder of the portion at the third node.

22. The controller as recited in claim 16, wherein an amount of the first subset of the portion of the model data is based at least in part on:

an available capacity for storing model data in the local memory of the second node; and an amount of communication between the first node and the second node for communicating the model data.

* * * * *